United States Patent Office 3,349,047
Patented Oct. 24, 1967

3,349,047
CURABLE LIQUID POLYSULFIDE RESIN STABLY ADMIXED WITH CALCIUM PEROXIDE
Eric A. Sheard, Hamilton Square, N.J., assignor to Thiokol Chemical Corporation, Bristol, Pa., a corporation of Delaware
No Drawing. Filed Oct. 22, 1965, Ser. No. 502,512
3 Claims. (Cl. 260—18)

This application is a continuation-in-part of U.S. application Ser. No. 138,123, filed on Sept. 14, 1961, now abandoned.

The present invention relates to the manufacture of rubber-like polysulfide polymers. More particularly the present invention relates to a novel method of curing polysulfide polymers to produce a white or colored elastomeric product as well as to the product thus produced.

Polysulfide rubbers have long been known and method of making them are disclosed in, for example, U.S. Patents 1,890,191; 2,195,380; 2,206,641; 2,206,642; 2,206,643; 2,216,044; 2,221,650; 2,235,621; 2,255,226; 2,278,127, and 2,278,128. In general such synthetic rubbers are prepared by reacting polyfunctional organic compounds with alkali metal or alkaline earth metal sulfide solutions to produce high molecular weight polymers having the recurring unit (RSS), wherein R is usually a divalent organic radical that may vary widely in its specific structure as disclosed in the patents referred to above, and SS represents a disulfide linkage through which the organic radicals are interconnected. In order to improve the properties of the polymers it is customary to use a mixture of difunctional and trifunctional organic compounds wherein the trifunctional compound is present in a relatively small amount to produce a slightly cross-linked structure upon cure.

Although the organic radicals represented by the symbol R above may vary considerably in their specific structure, the commercially important polymers are usually made from certain aliphatic halides, e.g. alkylene chlorides such as ethylene dichloride and its homologues or oxygen-containing aliphatic dichlorides such as bis-beta-chloroethyl formal. Thus, most of the commercial polymers are primarily composed of relatively short chain divalent alkylene and/or oxahydrocarbon radicals interconnected by disulfide groups.

The present invention is particularly concerned with liquid polysulfide polymers which can be obtained from the high molecular weight polysulfide polymers referred to above by a splitting process described in U.S. Patent 2,466,963. As disclosed in the latter patent, the high molecular weight polymers can be split to form polythiopolymercaptan polymers having molecular weights of the order of 500 to 25,000 and which are viscous liquids having viscosities within the range 300 to 100,000 centipoises at 25° C. Such liquid polymers can be cured by any of various curing agents as disclosed in U.S. Patent 2,466,963 to form solid elastomers having excellent resistance to acids, alkalis, petroleum hydrocarbons and atmospheric oxidation. Such liquid polymers have been extensively used in the production of rubbery coatings on a variety of surfaces and have been found especially useful in providing rubbery films having good adhesion to metal surfaces. Thus the cured compositions have been used as sealants for sealing panes of glass to metal window frames and as lining materials for integral fuel tanks of aircraft.

While a very wide variety of such liquid polymers can be prepared as indicated by the disclosures of the patents referred to above, the polymers that are presently of commercial importance fall within a somewhat more limited group. The commercially important liquid polymers are particularly described in articles by Fettes and Jorczak, published in "Industrial and Engineering Chemistry," vol. 42, page 2217 (1950), and vol. 43, page 324 (1951). As pointed out in these published articles, the commercially available liquid polymers such as LP-2 polymer described therein, are generally prepared from bis-beta-chloroethyl formal and are essentially composed of recurring

groups and have free mercapto terminals through which they may be cured to form a solid elastomer. In the manufacture of these commercial polymers a small percentage of trichloropropane is commonly mixed with the bis-beta-chloroethyl formal to provide cross-linking as described above.

For the purposes of the present invention the term liquid polysulfide polymers connotes not only mercapto terminated polymers of recurring groups, such as, preferably, bis(ethyleneoxy)methane, bis(butyleneoxy)methane, bis(ethylene)oxy and bis(butylene)oxy groups, linked by disulfide linkages as defined above but also those of such polymers which have an average molecular weight of approximately 2000 to 10,000 and preferably 3500 to 8000.

As indicated above, such liquid polymers, when mixed with a curing agent such as lead peroxide, can be applied to a metal or other surface and cured at room temperature or at an elevated temperature to form a strongly adherent rubber coating on the substrate. Such room temperature curing agents as lead peroxide do not form time-stable compositions with liquid polysulfide polymers as defined herein. Further, it has not been possible to date to produce a satisfactory coating of this type from compositions to provide white or discretionarily colored elastomers which possess good cold flow and compression resistant properties.

It is accordingly an object of the present invention to provide a method of curing a liquid polysulfide polymer at common room temperatures, as defined above, to produce a discretionarily white or colored elastomer. It is also an object of the present invention to provide a procedure for selectively retarding the rate of speed of the cure reaction. A further object of this invention is to provide compositions and means for increasing the adhesive properties of the cured elastomer. Another object of this invention is to produce a discretionarily white or colored elastomeric polysulfide polymer by cure at common room temperatures in the form of a coating or otherwise. Other objects of the invention will be in part obvious and in part pointed out hereafter.

It has been unexpectedly found according to the present invention that liquid polysulfide polymers of the type described above can be cured at common room temperatures i.e. 20° to 50° C., or at elevated temperatures to produce a discretionarily colored elastomeric product if calcium peroxide, activated with water, is used as the curing agent. This is unexpected in view of the facts that without such activation calcium peroxide is practically inert to reaction with polysulfide polymers and exhibits no potential for curing these liquid polysulfide polymers and that water per se is not effective for the practical common room temperature activation of other peroxides such as zinc or magnesium peroxide for use in the common room temperature cure of these liquid polysulfide polymers.

By "discretionarily colored" is meant that a practitioner at will may by suitable choice of fillers and pigments obtain white or any other colored cured rubbers using the compositions of the invention.

For the purposes of the present invention either pure calcium peroxide or any of the commercially available grades of calcium peroxide may be used as the source of this material. The preferred form of this reactant is a commercial grade material composed of 60% calcium peroxide and 40% inert filler material.

To be effective, the activated cure agent of the present invention must be used to cure the polysulfide polymers under neutral to basic pH conditions. For every 100 parts by weight of the liquid polysulfide material to be cured, approximately 1 to 8 and preferably 2 to 5 parts by weight of calcium peroxide (100%) and approximately 0.5 to 3 preferably 1 to 2 parts by weight of water are the effective amounts used to form the activated cure agent of the present invention.

In order to increase the "set up" properties of the cured elastomeric products produced using the activated cure agent of the present invention it is advantageous, according to the present invention, to use up to approximately 10 parts by weight of calcium hydroxide per 100 parts by weight of the polymer being cured in addition to the quantities of $Ca(OH)_2$ formed from the $CaO_2/H_2O$ reaction. When a cured elastomer has good "set up" properties it is meant that the elastomer cures up to approximately its ultimate physical properties within a relatively short period of time after the cure reaction.

In given applications it is also sometimes advantageous to be able to either accelerate or retard the rate of cure of the liquid polysulfide polymers. It has also been unexpectedly found according to the present invention that the activated calcium peroxide cure process of the present invention can be effectively slowed, i.e. retarded, using certain effective quantities of certain selected compounds which are designated herein as "retarders."

It has been found according to the present invention that the use of small amounts of at least one retarder selected from the particular group consisting of cadmium stearate, lead stearate, cobalt stearate, aluminum octate, aluminum distearate and oleic acid will effectively and desirably retard or slow the curing action of the cure compositions of the present invention. Cadmium stearate and aluminum octate are preferred, and particularly the former, since these retarders are relatively very effective and yet do not impart a masking color of their own which may interfere with the production of desired white or pastel colored elastomeric products. The use of cobalt stearate, however, leads to the production of a purple colored elastomeric product and the use of lead stearate leads to the production of a yellow colored elastomeric product. Where a purple or yellow elastomer is desired these latter two retarders are preferred over the former two and may serve the dual purpose of retarder and pigment. The other retarders, while not as effective in retarding action as the four previously described, they do not unduly interfere with the production of white or pastel colored products. The peculiar effectiveness of these particular and specific fatty acid and fatty acid salt materials as retarders, however, is unexpected in view of the fact that various other fatty acid salt materials of this type have been known to have substantially no effect as retarders or may, in fact, act as accelerators. This is illustrated below in Example 3. The effective amounts of the particular group of the above named effective retarders that are needed according to the present invention are at least approximately 0.1 to 5 and preferably 0.5 to 3 parts by weight per hundred parts by weight of the polysulfide polymer.

White, neutral to basic filler materials such as titanium dioxide, calcium carbonate, silicates such as calcium silicate and silica may also be used with the cure agents of the present invention to aid in the reinforcement of the cured product as well as to aid in the production of a white product where such a product is desired. Colored neutral to basic filler materials may be used when a colored elastomeric product is desired. It is preferable that the filler materials be approximately 0.01 to 10 microns and most preferable 0.05 to 0.4 micron in size. Generally, the finer the size of the filler the better is the reinforcement of the elastomer that is obtained. However, the finer sized particles are more difficult to incorporate into the precured systems and it is not possible to incorporate as much of the finer materials in the formulations as the coarser materials. These two factors have to be balanced together in preparing the curable mixtures of the present invention for the particular application involved. Particulate silica materials such as the commercial products Hi-Sil 233 and Cab-O-Sil, have a thixotropic effect on the curing and cured polymers when used with the calcium peroxide cure agents of the present invention and impart good non-sag properties to the curing system. By non-sag properties it is meant that the fromulation (polymer, cure agent, filler, etc.) during cure, can be readily manipulated at the desired cure site but that the system will retain its assigned shape even though placed in an unsupported position, such as, by merely being placed, putty-like as a strip on a wall or a ceiling. The amount of filler to be used with the cure agents of the present invention will vary greatly depending on the particular application. The amount of filler used, however, should not exceed approximately 150 and preferably 30 to 40 parts by weight for every 100 parts by weight of liquid polymer being cured. The use of these fillers is essential for some applications where reinforced polymers are a necessity.

Plasticizing materials known to the art, such as esters, particularly the phthalate esters, ethers, phosphate type plasticizers, aliphatic and aromatic plasticizers including unsubstituted, chlorinated and nitrated materials, etc., may be used with the compositions of the present invention to aid in the development of optimum viscosity for ease in handling, mixing and packaging procedures. The preferred plasticizers are of the chlorinated biphenyl type such as the Aroclor plasticizers. The amount of plasticizer used will also vary depending on the particular application involved. The amount of plasticizer used, however, should not exceed approximately 100 and preferably 10 to 15 parts by weight for every 100 parts by weight of the liquid polymer being cured. The use of plasticizers in some formulations is essential for the proper blending of these formulations as well as for the attainment of a mixture that can be readily worked and shaped during the cure process.

In order to enhance the adhesive properties of the cured polysulfide polymer elastomers of the present invention it is advantageous to also use an adhesive additive with the activated cure agent of the present invention. B-stage phenolic resins, which are ordinarily used as built-in adhesive additives in the standard lead peroxide type cure process, however, inhibit or "kill" the cure of the calcium peroxide polysulfide polymer compositions of the present invention. It has been unexpectedly found, however, according to the present invention that in general, polyfunctional epoxy resins may be added to the present one part compositions at time of their use and increase the adhesive properties of the cured elastomers yet without substantially interfering with the cure process. The epoxies, however, can not be stored with calcium peroxide because of a mutual reactivity. Optimum adhesion appears to be promoted by using effective quantities of approximately 4 to 8 parts by weight of the epoxy resin per 100 parts by weight of the liquid polysulfide polymer. Adhesion of the cured elastomer to a variety of substrates such as glass, aluminum, steel, and concrete is greatly enhanced by the use of the epoxy resin. Even after a water immersion treatment of the substrate after application and cure of the epoxy containing cure system, adhesion to aluminum, steel and concrete substrates is not substantially impaired. It is preferred that the epoxy resins which are to be used with the activated cure agent of the present invention have an equivalent weight of approximately 100 to 5000 and preferably 100 to 600 and have a viscosity of approximately 300 to 65,000 and preferably 500 to 900 centipoises at 25° C. Epoxy materials in general can be used in this regard, and include in their number certain commercial epoxies such as the Tipox resins, the ERL resins, the Kopoxite resins, the Epon resins and the Epi-Rez resins. In particular, the resins demonstrably used herein, Tipox A resin and the ERL-2774, ERL-3794 and ERL-2795 resins are especially useful. Although the resins specifically mentioned are those formed as the reaction products of epichlorohydrin and p,p'-isopropyledenediphenol, the latter commonly known as Bisphenol A, in general, any epoxy resin that has any organic backbone and contains a plurality of oxirane groups and that is also physically blendable with the present compositions may be used as taught herein. Each of the various epoxy resins has its own adhesive characteristics, of course, and the selection of the epoxy to be used in a particular application depends in good part upon the type substrate to which the polysulfide polymer is to be applied.

The elastomers produced using the activated cure agent of the present invention have outstanding resistance not only to attack by water and alkali, but outstanding resistance to cold flow as well. It is possible, of course, to take advantage of the outstanding properties of the elastomers produced by the compositions of the present invention with respect to their outstanding resistance to cold flow in carbon black reinforced systems to provide high strength, dimensionally stable cold molded elastomers. It is also to be noted that the activated cure agent of the present invention either alone or in combination with the above described accelerators, retarders, adhesive additives, etc., provides a non-toxic system. The elastomers produced by the process of the present invention can be used as sealants, joint fillers, cold moldings, castings, deck sealers and flexible adhesives.

Despite the number and different type of materials, i.e. retarders, accelerators, fillers, etc., that may be used as adjuvants in compositions of the present invention it is still possible to package these materials in various chemically time-stable, two-package, that is to say, two-part, combinations. By "time-stable" it is meant that various materials can be mixed together and stored for indefinite periods of time without causing chemical reaction to take place between the mixed materials in each of the parts or packages. In order to prepare such time-stable, two-package combinations it is necessary to take a few essential and critical precautions:

(a) The liquid polysulfide and epoxy resin (if the latter is to be used) must be separated during storage due to their mutual reactivity;

(b) The epoxy resin (if it is to be used) and calcium peroxide must also be kept apart during storage because of their mutual reactivity;

(c) The calcium peroxide must be kept away from water during storage to prevent a premature liberation of oxygen from the peroxide, and (d) Any materials such as the filler materials, which are to be stored with the calcium peroxide, should be substantially dry to also avoid a premature reaction between water and the calcium peroxide.

It is thus possible to package the cure agent, polymer, etc., where an epoxy resin is not required, as a one-package composition of the invention, the water being a second part added later at time of use. Such a packaging arrangement is particularly advantageous for use for cold molding compounds, primed sealant systems and general casting materials. Where an epoxy resin is needed, the four main ingredients must be arranged in at least two parts or packages, each part being a uniform blend of the ingredients, as follows.

Part A:
    Liquid polymer
    Calcium peroxide

Part B:
    Epoxy resin
    Water

Water may be excluded from Part B, and added later to the admixture of Parts A and B at the time of use. The chemical stability of the calcium peroxide, in the absence of water, allows the liquid polysulfide and peroxide to be packaged together without any evidence of a reaction occurring between the two. This is unusual in that many other prior art peroxides, like $PbO_2$, do not exhibit time-stability with polysulfides to form time-stable compositions. It is to be noted that where an epoxy resin is not needed, the packaged system need only contain liquid polymer and calcium peroxide and the water needed to activate the cure reaction can be readily added from a source external, such as from the moisture in the air, to the packaged system at the time it is desired to effect the cure. Indeed an approximately 50/50 equal volume non-adhesive containing sealant formulation could be packaged with water prior to cure in two parts as follows.

| Part A: | Parts by wt. |
|---|---|
| LP-2 liquid polysulfide polymer [1] | 48 |
| Titanox RA-50 [2] filler | 20 |
| Witcarb RC [3] filler | 10 |
| 60% $CaO_2$ | 8 |
| Part B: | |
| LP-2 liquid polysulfide polymer | 52 |
| $Ca(OH)_2$ | 6 |
| Water | 2 |
| Witcarb RC filler | 5 |

[1] Liquid polysulfide polymer having an average molecular weight of 4,000 and a viscosity of 350–450 poises at 25° C.
[2] Rutile $TiO_2$.
[3] Calcium carbonate.

A non-sagging, adhesive containing sealant formulation could be packaged prior to cure in two parts as follows.

| Part A: | Parts by wt. |
|---|---|
| LP-2 liquid polysulfide polymer | 100 |
| Titanox RA-50 filler | 20 |
| Witcarb RC filler | 10 |
| Hi-Sil 233 filler | 5 |
| 60% calcium peroxide | 8 |
| Cadmium stearate | 2 |
| Aroclor 1254 [1] plasticizer | 5 |
| | 150 |
| Part B: | |
| Tipox A [2] resin | 7.5 |
| Calcium hydroxide | 6 |
| Water | 2 |
| Witcarb RC filler | 5 |
| | 20.5 |

[1] Chlorinated biphenyl material containing 54% by weight of chlorine.
[2] Epoxy resin with an equivalent weight of 179–194 and a viscosity of 500–700 cps. at 25° C.

The following table, in resume, shows cure systems which initially provide white elastomers:

TABLE 1

| Cure Agent | Adhesion | U. V. Discoloration | Toxicity | Activators | Time Stable |
|---|---|---|---|---|---|
| Antimony trioxide | (1) | Severe | None | Basic pH, sulfur | No. |
| Calcium peroxide | With epoxy resin additive. | None | do | Water, neutral to basic pH | Yes. |
| Dibutyl tin oxide | (1) | Yes | do | Acidic pH | No. |
| Epoxy | (2) | Yes, with amines | Yes, with amines | Amines | No. |
| Isocyanates | (2) | Yes | Yes | Amines, basic pH | No. |
| Sodium Carbonate peroxide | Bubbles (1) | None | None | | No. |
| Zinc peroxide | With phenolic resin additive. | Will discolor with phenolic | do | Stearic acid, sulfur, heat, epoxy resins (3). | |

[1] No suitable adhesive additive known.
[2] Inherent to selected substrates.
[3] No room temperature cure; requires temperatures greater than 50° C.

The following examples are merely illustrative of the present invention and are not intended as a limitation upon the scope thereof.

EXAMPLE 1

This example illustrates the fact that water cannot be used to activate at common room temperatures all alkaline earth metal peroxides so as to obtain thereby a cure of liquid polysulfide polymers. Several formulations were prepared containing various alkaline earth metal peroxides and attempts were made to cure them at a common room temperature, i.e., about 80° F., in the presence of $H_2O$. The term "in the presence of" as used with regard to the present invention means that the reactant being discussed is admixed with the formulation being evaluated. The formulations and results are as shown here:

| Components | Parts by Weight | | | |
|---|---|---|---|---|
| LP-2 polysulfide polymer | 100 | 100 | 100 | 100 |
| Silene EF [1] | 20 | | 20 | |
| Calcene TM [2] | | | | 20 |
| SRF Black | | | 6 | 6 |
| $CaO_2$ | 6 | | | |
| $ZnO_2$ | | 6 | | |
| $MgO_2$ | | | | |
| Water | 3 | 3 | 2 | 2 |
| Comments | ([3]) | ([3]) | ([4]) | ([4]) |

[1] Precipitated calcium silicate of approximately 0.04 micron in particle size. In 5% w./w. aqueous solution it has a pH of 10.
[2] Calcium carbonate of approximately 0.1 micron in particle size. In 5% w./w. aqueous solution it has a pH of 7.3 to 7.5.
[3] No Cure.
[4] Cured, Tack Free in 24 Hours.

EXAMPLE 2

This example further illustrates the unusual capability of (a) forming time-stable one-package compositions of the invention, and of (b) curing said compositions at common room temperatures either by admixture with water at time of use or exposure to the moisture in the atmosphere. The example further illustrates that compounds having either similar cations or anions as calcium peroxide, but dissimilar anions or cations respectively, do not effect room temperature cure in otherwise identical alkaline compositions. Yet further, the example illustrates that the rate of cure of calcium peroxide-polysulfide compositions of the invention may be enhanced at common room temperature by the inclusion therein of an alkaline "moisture grabber," that is to say an alkaline compound which has the quality of drawing the moisture from the air, such as deliquescent alkaline salts. Use of such a water grabber does not help the common anion or cation agent systems.

The following formulations in parts by weight were uniformly admixed and stored under otherwise anhydrous conditions at 75° F. in collapsable tin tubes similar to toothpaste tubes.

| Recipe | Formulation Number | | | | | | | |
|---|---|---|---|---|---|---|---|---|
| | 1 | 2 | 3 | 4 | 5 | 6 | 7 | 8 |
| LP-2 Polysulfide | 100 | 100 | 100 | 100 | 100 | 100 | 100 | 100 |
| Silene EF | 20 | 20 | 20 | 20 | 20 | 20 | 20 | 20 |
| Calcium Peroxide | 6 | 6 | | | | | | |
| Calcium Chromate | | | 6 | | 6 | | | |
| Zinc Peroxide | | | | | 6 | | 6 | |
| Zinc Chromate | | | | | | | 6 | 6 |
| Water | | 3 | | | 3 | 3 | | 3 |

During the two week interval of testing, formulation 2 containing calcium peroxide and water cured to a firm completely cured rubber in its tube in less than 24 hours, whereas none of the other formulations cured at all in their tubes during the entire interval of test. Formulation 2 was not further tested but the others were as explained below:

A two inch bead of each of formulations 3 to 8 was extruded into a three sided rectangular aluminum channel, the top surface of each bead open to the environment, the other surfaces being in contact with the sides of the channel. The bead containing channels were stored in a 50% relative humidity atmosphere at approximately 73° F. In less than 48 hours after such exposure, formulation 1 containing calcium peroxide had developed a tacky cured thick skin-like surface and within about 10 days it cured to a tack-free rubber. The other formulations were still completely uncured and fluid even after 30 days. Similar results were obtained with 0.1 inch films of formulations 1, 3, 4, 5, 6, 7 and 8, spread onto a glass surface and so exposed. The film formed from formulation 1 fully cured to a snappy rubber within 2 days, but none of the other formulations cured at all.

Formulations 1 and 3 to 8 were further tested. A small amount of each was squeezed from its tube and admixed with the alkaline moisture grabber, $K_3PO_4$, tribasic potassium phosphate, so as to contain about 1% by weight of the salt. The salt containing formulations were then spatulated into three sided aluminum channels and exposed as above at 50% relative humidity and 73° F. Again, formulation 1 had cured within less than 48 hours, whereas none of the other formulations had cured at all in over 20 days, but were still fluid with unskinned surfaces.

EXAMPLE 3

This example illustrates the need for the use of both water and neutral to basic pH conditions for a successful cure of liquid polysulfide polymers with calcium peroxide. A master batch was prepared containing:

| | Parts by wt. |
|---|---|
| LP-2 liquid polysulfide polymer | 100 |
| Silene EF, highly alkaline filler | 20 |
| $CaO_2$ (60%) | 6 | for each proposed system to be tested. The tests were conducted at room temperature. The materials admixed with the master batch, the amounts used therein and results obtained, are shown in the following list:

| Additives | Amount (phr.) | Comments | Systems |
|---|---|---|---|
| None | 0 | No Cure | Anhydrous. |
| Barium Acetate (20%)[1] | 1 | Tacky Cure | Alkaline. |
| Cadmium acetate (20%) | 1 | ----do---- | Do. |
| Magnesium acetate (20%) | 1 | ----do---- | Do. |
| Potassium acetate (20%) | 1 | ----do---- | Do. |
| Sodium acetate (20%) | 1 | ----do---- | Do. |
| Zinc acetate (20%) | 1 | ----do---- | Do. |
| Acetic acid (20%) | 1 | ----do---- | Do. |
| Sodium chloride (20%) | 1 | Cured Tack Free | Do. |
| Water | 2 | ----do---- | Do. |
| Durez 10694[2]/Water | 5/2 | No Cure | |
| Aroclor 1254 | 10 | ----do---- | Anhydrous. |
| Ethyl alcohol (95%) | 2 | ----do---- | Practically anhydrous. |
| Ca(OH)$_2$ | 2 | ----do---- | Anhydrous. |
| Ca(OH)$_2$/Water | 6/2 | Cured Tack Free | Alkaline. |

[1] The percentages shown are of w./w. percent aqueous solutions.
[2] B stage type phenolic resin.

EXAMPLE 4

This example illustrates the effect of various materials as retarders in the cure process of the present invention. A two package formulation comprised of a Part A and a Part B was prepared with which to test each of the proposed retarding agents. The two package system was compounded, then Parts A and B were blended. The formulations and results obtained therewith for the various proposed retarding agents under room temperature cure conditions are shown in the following table.

Part A:
| | Parts by wt. |
|---|---|
| LP-2 liquid polysulfide polymer | 100 |
| Witcarb RC | 15 |
| Titanox RA-50 | 20 |
| 60% calcium peroxide | 8 |
| Hi-Sil 233 | 5 |
| Aroclor 1254 | 5 |
| Retarder, as shown below. | |

Part B:
| | Parts by wt. |
|---|---|
| Tipox A resin | 7 |
| Aroclor 1232[1] | 5 |
| Hi-Sil 233 | 1 |
| Water | 2 |
| Calcium hydroxide | 6 |

[1] Chlorinated biphenyl, 32% w./w. of chlorine.

| Retarder | 1 | 2 | 3 | 4 | 5 | 6 | 7 | 8 | 9 | 10 | 11 | 12 |
|---|---|---|---|---|---|---|---|---|---|---|---|---|
| Stearic acid | | 1 | | | | | | | | | | |
| Formic acid | | | 1 | | | | | | | | | |
| Oleic acid | | | | 1 | | | | | | | | |
| Aluminum distearate | | | | | 1 | | | | | | | |
| Calcium stearate | | | | | | 1 | | | | | | |
| Aluminum palmitate | | | | | | | 1 | | | | | |
| Cobalt Stearate | | | | | | | | 1 | | | | |
| Cadmium Stearate | | | | | | | | | 1 | | | |
| Iron Stearate | | | | | | | | | | 1 | | |
| Lead Stearate | | | | | | | | | | | 1 | |
| Aluminum Octoate | | | | | | | | | | | | 1 |
| Work Life, mins | [1] 20 | | [2] 18 | [3] 22 | [3] 24 | [4] 20 | [4] 20 | [3] 30 | [3] 45 | [4] 20 | [3] 40 | [3] 30 |
| Hardness, Shore A: | | | | | | | | | | | | |
| 1 day | 31 | ([5]) | 32 | 31 | 31 | 34 | 30 | 34 | 26 | 32 | 23 | 25 |
| 3 days | 35 | ([5]) | 32 | 34 | 33 | 36 | 30 | 35 | 26 | 32 | 25 | 27 |
| 5 days | 36 | ([5]) | 33 | 36 | 35 | 36 | 31 | 36 | 27 | 32 | 25 | 28 |
| Color | W | W | W | W | W | W | W | P | W | T | Y | W |

[1] Standard for comparison, no retarder added.
[2] Acceleration of cure.
[3] Retardation of cure.
[4] No retardation of cure.
[5] No cure.

NOTE.—W = White; P = Purple; T = Tan; Y = Yellow.

It is to be noted that stearic acid completely inhibits or "kills" the cure and that formic acid had some small effect as an accelerator. Calcium stearate, aluminum palmitate and iron distearate had no effect, and oleic acid and aluminum distearate had some definite effect as retarders. The other materials had a marked effect as retarders on the cure.

EXAMPLE 5

This example illustrates the use of cadmium stearate as a retarder at room temperature with the activated cure agent of the present invention. Cadmium stearate is the most preferred retarder according to the present invention. Part A was mixed with Part B to initiate the cure in each of the five separate tests in the series.

*Masterbatch*

Part A:
| | Parts by wt. |
|---|---|
| LP-2 polysulfide polymer | 100 |
| Witcarb RC | 15 |
| Titanox RA-50 | 20 |
| 60% calcium peroxide | 8 |
| Hi-Sil 233 | 5 |
| Aroclor 1254 | 5 |
| Cadmium stearate | As shown |

Part B:                                           Parts by wt.
  Tipox A resin _____ 7
  Hi-Sil 233 _____ 1
  Aroclor 1232 _____ 5
  Water _____ 2
  Calcium hydroxide _____ 6

|  | 1 | 2 | 3 | 4 | 5 |
|---|---|---|---|---|---|
| Cadmium stearate, phr | 0 | 0.5 | 1 | 2 | 4 |
| Work life, hrs.:mins | 0:40 | 1:30 | 2:00 | 2:30 | 3:15 |
| Tack Free Time, hrs | 24 | 24 | 24 | 24 | 36 |
| Hardness, Shore A: | | | | | |
| 1 day | 35 | 35 | 34 | 35 | 30 |
| 3 days | 35 | 40 | 37 | 37 | 30 |
| 5 days | 35 | 40 | 37 | 37 | 30 |
| Physical Properties, pressout after 10' at 287° F.: | | | | | |
| Tensile, p.s.i | 175 | 170 | 170 | 160 | 100 |
| 200% Modulus, p.s.i | 80 | 72 | 68 | 58 | 30 |
| Elongation, percent | 540 | 600 | 660 | 730 | 860 |
| Hardness, Shore A | 34 | 36 | 34 | 35 | 30 |

It is to be noted that the use of relatively excessive amounts of cadmium stearate, while retarding the cure, will also have a generally poor effect on the physical properties of the cured polymer.

EXAMPLE 6

This example illustrates the use of various epoxy resins to impart adhesive properties under various conditions to a masterbatch polysulfide polymer/cure agent formulation according to the process of the present invention.

*Masterbatch*

Parts by wt.
LP-2 polysulfide polymer _____ 100
Witcarb RC _____ 15
Titanox RA-50 _____ 20
Aroclor _____ 30
Calcium peroxide (60%) _____ 8
Calcium hydroxide _____ 6
Water _____ 1.5
Epoxy resin _____ As shown

| Epoxy resin | Amount | Adhesion to Aluminum | |
|---|---|---|---|
| | | Before Immersion of Aluminum in Water | After Immersion of Aluminum in Water |
| None | 0 | None | None |
| ERL-2774 [1] | 10 | Good | None |
| ERL-3794 [1] | 10 | Good | None |
| ERL-2795 [1] | 10 | Good | Good |

[1] Epoxy resins having equivalent weights of 140 to 200 and a viscosity of 500 to 19,000 centipoises at 25° C.

EXAMPLE 7

This example illustrates the effect of varying the amount of epoxy resin used with the cure agent of the present invention upon the working life of the formulation and the adhesive and physical properties of the cured elastomer.

*Masterbatch*

Part A:                                           Parts by wt.
  LP-2 polysulfide polymer _____ 100
  Titanox RA-50 _____ 20
  Witcarb RC _____ 5
  Aroclor 1254 _____ 10
  Hi-Sil 233 _____ 5
  60% CaO$_2$ _____ 8
  Cadmium stearate _____ 2

Part B                                            Parts by wt.
  Ca(OH)$_2$ _____ 6
  Water _____ 2
  Witcarb RC _____ 10
  Tipox A resin _____ As shown

|  | 1 | 2 | 3 | 4 | 5 |
|---|---|---|---|---|---|
| Tipox A resin | 0 | 2.5 | 5 | 7.5 | 10 |
| Work life, hrs.:mins | 3:30 | 3:00 | 2:45 | 2:30 | 2:15 |
| Cold flow | None | None | None | None | None |
| Normals, 10 minute pressout at 287° F.:[1] | | | | | |
| Tensile, p.s.i | 350 | 280 | 160 | 140 | (²) |
| Elongation, percent | 500 | 530 | 430 | 720 | (²) |
| Hardness, Shore A | 53 | 45 | 38 | 35 | (²) |
| Heat Aged, 1 week at 158° F.: | | | | | |
| Tensile, p.s.i | 310 | 200 | 125 | 120 | |
| Elongation, percent | 330 | 260 | 280 | 420 | |
| Hardness, Shore A | 56 | 49 | 43 | 38 | |
| Heat Aged, 1 week at 212° F.: | | | | | |
| Tensile, p.s.i | 260 | 180 | 120 | 90 | |
| Elongation, percent | 160 | 160 | 220 | 230 | |
| Hardness, Shore A | 54 | 47 | 41 | 37 | |
| Heat Aged, 1 week at 250° F.: | | | | | |
| Tensile, p.s.i | 220 | 215 | 70 | 90 | |
| Elongation, percent | 30 | 30 | 30 | 50 | |
| Hardness, Shore A | 81 | 81 | 66 | 53 | |
| Adhesion (pounds/inch):[3] | | | | | |
| Aluminum | 0-0 | 5A-5A | 15C-13A | 21C-17C | 18C-14C |
| Steel | 0-0 | 4A-4A | 15C-13A | 20C-15C | 17C-12C |
| Glass | 0-0 | 0-0 | 15C-0 | 24C-5A | 19C-4A |

[1] Cured 7 days at room temperature.
[2] Too soft.
[3] After 11 days in air and after 7 days in air plus 4 in water.

NOTE.—A=Adhesive failure; C=Cohesive failure; 0=No adhesion; at indicated pounds/inch.

The formulations containing the various epoxy resins were coated on 3 x 6" aluminum panels. The results are given showing the adhesive qualities of the various cured systems where the coated panels were tested after cure and both before and after the coated panels were immersed in water at room temperature for four days.

The epoxy resin tends to act as a cure accelerator as well as to impart adhesive properties to the cured elastomer. The use of relatively large amounts of the epoxy also tends to have a deleterious effect on the physical properties of the cured elastomer.

The adhesion test used was a modification of ASTM,

D903-49, part 6, page 691 (1958). In the modification a two inch long end of a 3" x 6" piece of unsized airplane fabric is coated with the composition being tested and the coated end is applied to a similarly coated two inch long end of a 3" x 6" substrate panel. After the designated cure time, two one-inch wide strips are cut, side by side, from the center of the strip of fabric from the uncoated end down through the coated end without removing the coated end from the substrate. The uncoated ends of the strips are used as handles with which to attempt to pull the coated end from the substrate at the rate of two inches/minute. The uncoated end is pulled down over the coated end for the pulling operation (180° relative to the area of adhesion). The values shown represent an average of two tests for each of the series of conditions employed. It is to be noted also that the use of the higher amounts of epoxy resin, approximately 10 parts/100 parts of polymer, will tend to produce a product that, although too soft for commercial purposes, will still exhibit some adhesive properties.

EXAMPLE 8

This example illustrates the effect on the adhesive and physical properties, work life, etc., of the cured polymers that is obtained by varying the quantities of several of the materials that are used in the cure process of the present invention.

*Masterbatch*

| | Parts by wt. |
|---|---|
| LP-2 polysulfide polymer | 100 |
| Witcarb RC | 25 |
| Titanox RA-50 | 10 |
| Aroclor 1242 | 20 |
| Attagel 20 | 5 |

Other components, as shown below:

to the cure system when all the components are blended together to achieve the cure reaction. Some of the pigments that may be used in this respect are the following.

| Pigment: | Color imparted to cured polymer |
|---|---|
| Montastral Blue B | Blue |
| Chromium oxide | Green |
| Cadmium Orange | Orange |
| Cadmium Yellow Lithopone | Yellow |
| Molybdate Orange | Orange |
| Cadmium Red Lithopone | Red |

The Montastral Blue B pigment should not be stored with the epoxy components of the cure system of the present invention where a particular formulation requires the use of an epoxy adhesive additive. Approximately 0.5 to 15 and preferably 3 to 10 parts by weight of these pigments per hundred parts by weight of the liquid polysulfide polymer will impart the desired color to the cured elastomer. The amount of pigment actually used in a particular formulation will depend on the shade of color desired and the combined quantity of all the components being used in the formulation. The cured elastomers produced using the cure process of the present invention are very compression set resistant particularly when compared with polysulfide elastomers produced with other white or pastel colored cure systems. By compression set resistant it is meant that property exhibited by an elastomer whereby when subjected to compression forces which are subsequently released the elastomer will readily return to its original pre-compressed configuration (size and shape).

I claim:

1. A stable, unitary liquid polymer composition protected from moisture and capable of being shipped and

| Test: | | | | | | | | | |
|---|---|---|---|---|---|---|---|---|---|
| Tipox A resin | 7 | 7 | 7 | 7 | 7 | 7 | 7 | 7 | 7 |
| CaO₂(60%) | 4 | 6 | 8 | 10 | 8 | 8 | 8 | 8 | 8 |
| Ca(OH)₂ | 6 | 6 | 6 | 6 | 6 | 6 | 2 | 4 | 8 |
| Water | 1.5 | 1.5 | 1.5 | 1.5 | 0.5 | 3 | 1.5 | 1.5 | 1.5 |
| Work life, hrs.:mins | 0:55 | 0:35 | 0:30 | 0:25 | 2:35 | 0:20 | 1:25 | 1:30 | 0:30 |
| Cure time | O'nite | O'nite | O'nite | O'nite | O'nite | O'nite | O'nite | O'nite | O'nite |
| Hardness, Shore A: | | | | | | | | | |
| 3 days | 28 | 27 | 27 | 27 | 9 | 31 | 12 | 12 | 27 |
| 7 days | 30 | 31 | 30 | 30 | 18 | 31 | 29 | 30 | 33 |
| Physical Properties:[1] | | | | | | | | | |
| Tensile, p.s.i | 130  165 | 150  190 | 145  185 | 125  170 | 110  150 | 150  240 | 145  220 | 150  210 | 160  235 |
| | 210  250 | 235  290 | 200  265 | 200  255 | 190  210 | 330  330 | 245  275 | 235  310 | 255  230 |
| 100% Modulus, p.s.i | 50  70 | 60  80 | 50  75 | 45  70 | 35  60 | 50  75 | 60  80 | 55  90 | 55  85 |
| | 80  85 | 85  100 | 75  95 | 80  100 | 75  25 | 95  105 | 75  85 | 80  95 | 80  90 |
| Elongation, percent | 470  430 | 440  360 | 490  430 | 470  420 | 480  430 | 470  470 | 460  430 | 480  430 | 500  490 |
| | 500  470 | 390  380 | 470  400 | 400  350 | 430  390 | 470  370 | 530  500 | 510  450 | 530  400 |
| Hardness, Shore A | 30  37 | 30  38 | 31  37 | 31  38 | 28  37 | 32  41 | 32  41 | 33  43 | 33  44 |
| | 40  43 | 43  47 | 41  47 | 41  47 | 42  45 | 43  48 | 43  45 | 44  46 | 45  47 |
| Adhesion:[2] | | | | | | | | | |
| Aluminum | 11C  12C | 10C  13C | 13C  13C | 16C  17C | 4A  11C | 20C  20C | 7AC  15C | 10C  16C | 10C  16C |
| Steel | 10AC  10C | 12AC  15C | 10AC  15C | 18C  8C | 5A  13C | 19C  17C | 5A  17C | 8C  18C | 10C  20C |
| Glass | 9AC  2A | 8AC  2A | 8AC  2A | 14C  2A | 3A  2A | 16C  2A | 3A  2A | 3A  2A | 5A  2A |

[1] After Pressout in 10' at 287° F., Normals (7 days at room temp.) followed by 1 week heat ages at 158, 212, 250° F.
[2] 180° peels at 2"/min., after 11 days in air and after 7 days in air plus 4 in water.

A comparison of the hardness values obtained in tests 7, 8, 3 and 9 (in that order of comparison) illustrates the unexpected utility of the use of additional amounts of calcium hydroxide in the process of the present invention. By keeping the amount of calcium peroxide and water that is used constant and by increasing the amount of additional CA(OH)₂ that is added it is possible to substantially speed up the setup time of the cured polymers.

Various pastel colored pigments can be used to impart a pastel color to the polysulfide polymers cured by the novel cure process of the present invention. The pigments can be blended and stored with one or more of the storable components (as described above) of the cure system of the present invention or they can be added stored in a single container and later being deposited in place without agitation or intermixing with other material for complete curing solely by contact of its surface with moisture-containing surroundings, said composition comprising essentially (a) a liquid polyalkylene polysulfide polymer having thoroughly dispersed therein, (b) an alkaline desiccating, deliquescent, dormant curing and accelerating agent adapted and sufficient to dry said polymer, to attract and absorb said moisture from said surroundings, to cure said polymer when activated by the presence of moisture and to hasten the curing of said polymer, said curing and accelerating agent being water-soluble and composed of calcium peroxide.

2. A one-package, time-stable, substantially anhydrous polymer composition capable of being cured to a solid polysulfide rubber upon exposure to water at common room temperatures and also capable of being shipped and stored in a single container and later being deposited in place wtihout agitation or intermixing with other material for complete curing solely by contact of its surface with moisture-containing surroundings, the one-package polymer composition consisting essentially of a liquid polythiopolymercaptan polymer in which there is dispersed from about 1 to about 8 parts by weight of calcium peroxide, all quantities being based upon each 100 parts by weight of liquid polythiopolymercaptan polymer contained in the one-package polymer composition.

3. A one-package polymer composition according to claim 2, in which polymer composition there is also dispersed from about 0.1 to about 5 parts by weight of a cure rate retarding agent selected from the group consisting of cadmium stearate, lead stearate, cobalt stearate, aluminum octoate, aluminum distearate, and oleic acid.

References Cited

UNITED STATES PATENTS

| | | | |
|---|---|---|---|
| 3,142,656 | 7/1964 | Carpenter | 260—79.1 X |
| 2,940,958 | 6/1960 | Smith | 260—79.1 |
| 2,929,794 | 3/1960 | Simon et al. | 260—830 |
| 2,871,217 | 1/1959 | Howard | 260—830 |
| 2,787,608 | 4/1957 | Gregory et al. | 260—830 |
| 2,466,963 | 12/1949 | Patrick et al. | 260—79.1 |

OTHER REFERENCES

Chemical Abstract, "Liquid Thiokols," Apuckhtima et al., 52: 15111b.

Industrial & Engineering Chemistry, "Polysulfide Liquid Polymers," Jorczak et al., 43: No. 2, pp. 324–328.

JAMES A. SEIDLECK, *Primary Examiner.*

L. J. BERCOVITZ, *Examiner.*

C. W. IVY, *Assistant Examiner.*